Figure 1:
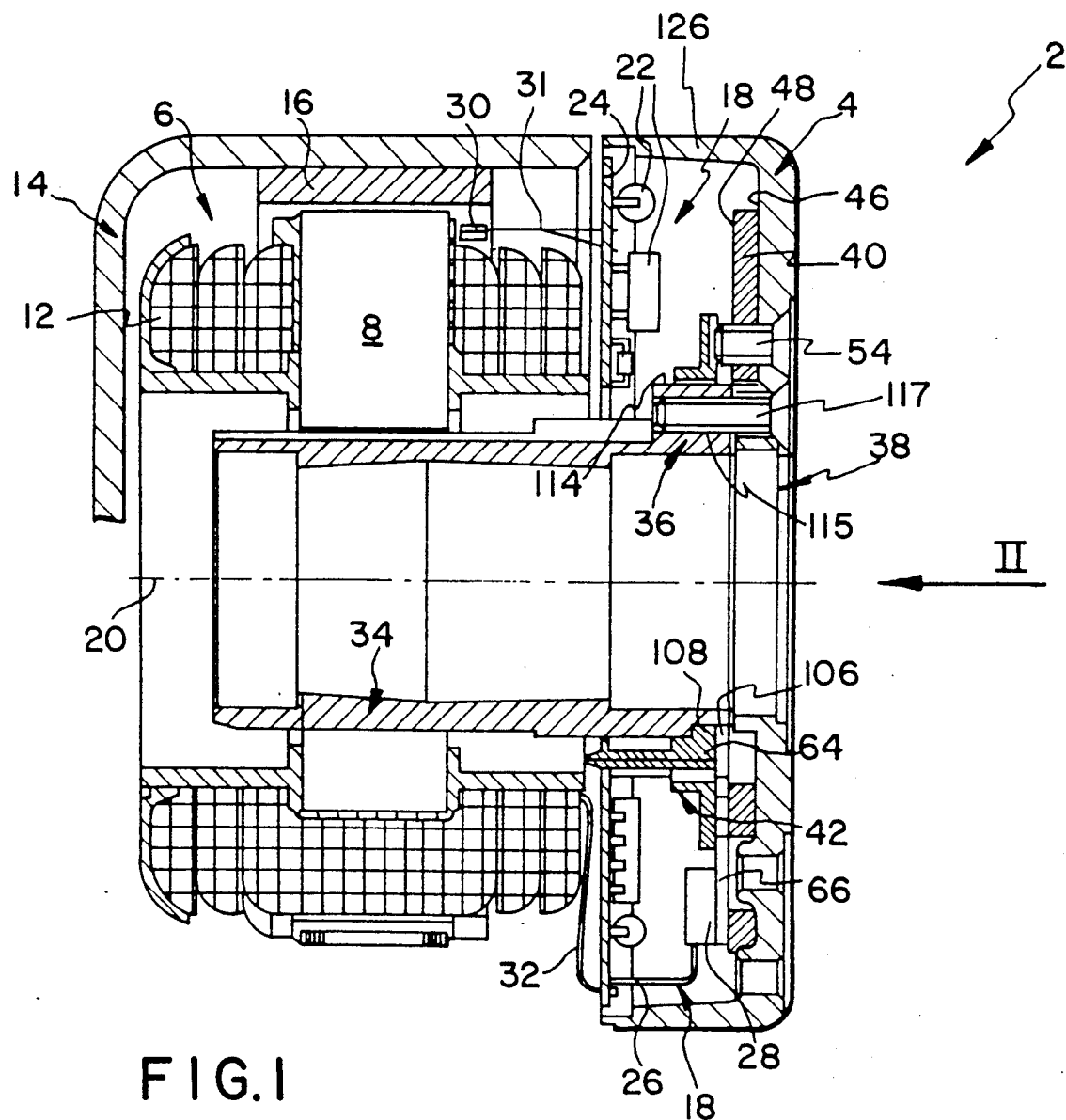

United States Patent [19]

Reinhardt et al.

[11] Patent Number: 5,049,769
[45] Date of Patent: Sep. 17, 1991

[54] COLLECTORLESS EXTERNAL-ROTOR MOTOR WITH SEMICONDUCTOR COOLING SYSTEM

[75] Inventors: Wilhelm Reinhardt, Schrozberg-Gütbach; Franz Jakob, Mulfingen-Zaisenhausen; Rudolf Rebenstrost, Niedernhall; Dieter Best, Ingelfingen, all of Fed. Rep. of Germany

[73] Assignee: ebm Elektrobau Mulfingen GmbH & Co., Mulfingen, Fed. Rep. of Germany

[21] Appl. No.: 450,179

[22] Filed: Dec. 13, 1989

[30] Foreign Application Priority Data

Dec. 17, 1988 [DE] Fed. Rep. of Germany ....... 3842588

[51] Int. Cl.⁵ ..................... H02K 5/18; H02K 11/00; H02B 1/00; H02B 1/56
[52] U.S. Cl. ..................... 310/64; 310/67 R; 310/68 R; 310/68 B; 361/386; 361/388
[58] Field of Search ............ 310/67 R, 64, 68 R, 310/68 B, 52, DIG. 6, 91; 318/138, 254; 361/386, 388-389

[56] References Cited

U.S. PATENT DOCUMENTS

| | | | |
|---|---|---|---|
| 3,809,935 | 5/1974 | Kristen et al. | 310/68 |
| 4,365,187 | 12/1982 | McDaniel et al. | 318/254 |
| 4,724,347 | 2/1988 | Reinhardt et al. | 310/68 R |
| 4,840,222 | 6/1989 | Lakin et al. | 310/64 |

FOREIGN PATENT DOCUMENTS

| | | |
|---|---|---|
| 2146893 | 4/1973 | Fed. Rep. of Germany . |
| 2843969 | 4/1980 | Fed. Rep. of Germany .... 310/67 R |
| 3439665 | 5/1986 | Fed. Rep. of Germany . |
| 137601 | 10/1979 | Japan . |
| 2174253 | 10/1986 | United Kingdom .............. 310/52 |

Primary Examiner—Steven L. Stephan
Assistant Examiner—C. LaBalle
Attorney, Agent, or Firm—Goodman & Teitelbaum

[57] ABSTRACT

The invention relates to a collectorless direct-current external-rotor motor (2), which includes a stator (6) with stator windings (12) fastened to a motor flange (4), an external rotor (14) enclosing the stator (6) on its side facing away from the motor flange (4), as well as an electronic circuit arrangement (18) driving the stator windings (12). This circuit arrangement (18) has a conductor plate (24) provided with electronic components (22) arranged adjacent to the flange-side facing the stator (6), as well as several power semiconductors (28) electrically connected to the conductor plate (24), arranged in heat-conducting contact with the motor flange (4). The power semiconductors (28) are joined indirectly by an annular disk-form cooling body (40) to the motor flange (4) to provide a heat-conducting effect. The cooling body (40) forms a preassembled component with the conductor plate (24) and a carrier element (42) which support the conductor plate (24).

24 Claims, 9 Drawing Sheets

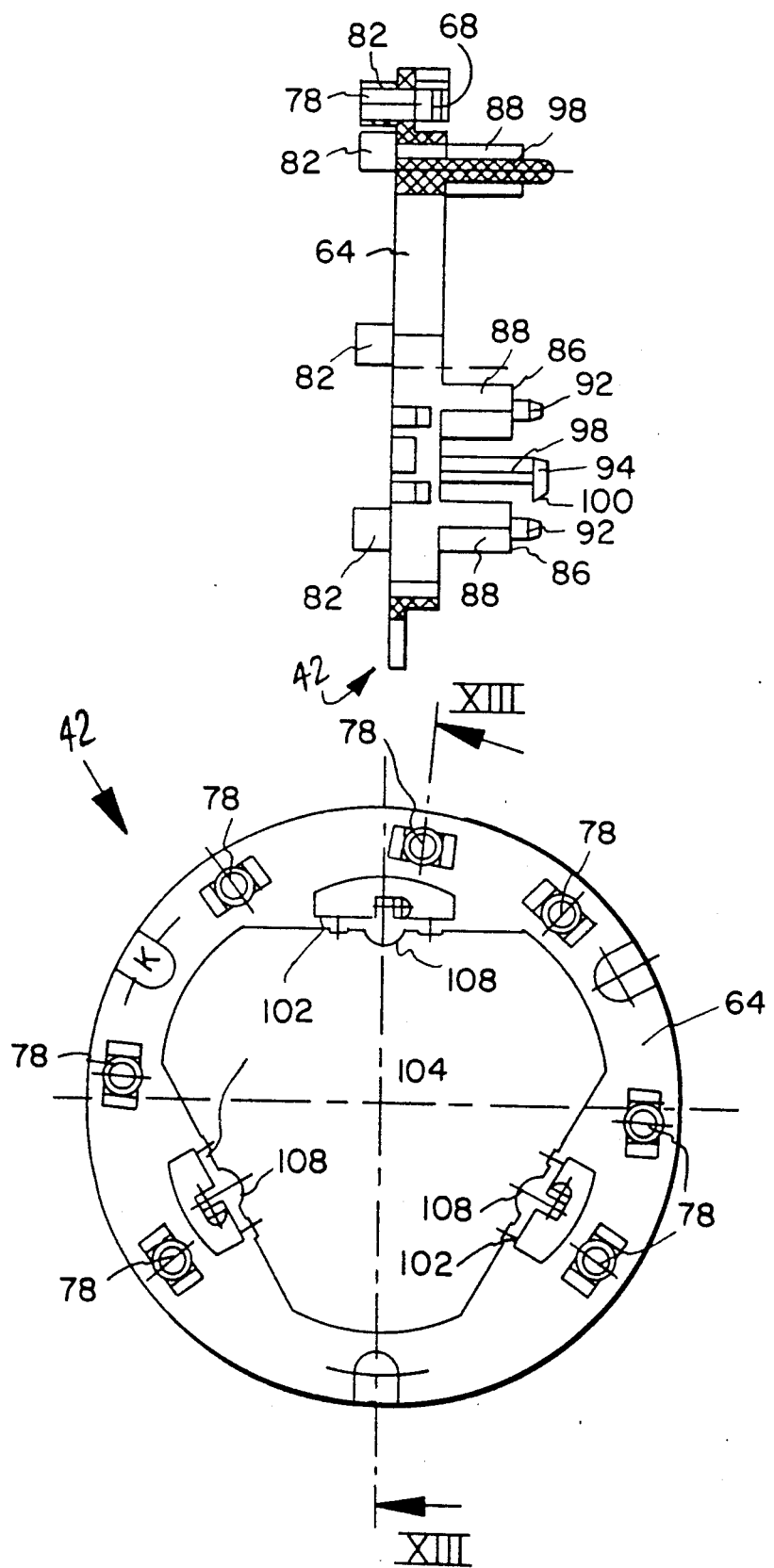

COLLECTORLESS EXTERNAL-ROTOR MOTOR WITH SEMICONDUCTOR COOLING SYSTEM

The present invention relates to a collectorless direct-current external-rotor motor, consisting of a stator fastened to a motor flange with stator windings, an external rotor enclosing the stator on its side facing away from the motor flange, as well as an electronic circuit arrangement driving the stator windings, with a conductor plate arranged facing the stator on flange side, carrying electronic components, as well as with power semiconductors electrically connected to the conductor plate, in heat-conducting contact with the motor flange.

In collectorless direct-current motors a commutation of the stator winding currents is performed by power semiconductors, for example power transistors. This commutation process, i.e. the switching on and off of the power semiconductors, is controlled by at least on Hall-IC which detects the particular angular position of the rotor. Especially in the case of motors of medium to relatively high power there arises in the power semiconductors a heat conditioned by power loss, so that the power semiconductors must be cooled in order to prevent their destruction on too great a heat development.

From German patent DE-PS 34 39 665 there is known a motor according to this category, in which the power semiconductors, for the purpose of cooling, are mounted in heat-conducting contact with the motor flange on its outside. The conductor plate carrying the remaining electronic components is axially slid onto the free end of a face insulation shaft of the stator and supported there for securement against twisting. The power semiconductors fastened to the motor flange are connected by connecting lines electrically to the conductor plate, in which arrangement the connecting lines extend in each case through an opening of the motor flange. This formation assures, to be sure, a very good cooling of the power semiconductors, since the motor flange stands in direct contact with the outside air and can lead off the absorbed heat to this outside air. To be sure, here in this formation there occurs the disadvantage of a complicated assembling of the motor, since the power semiconductors connected to the conductor plate must in the assembling of the motor flange in each case be individually led through the openings of the flange and then fastened. Depending on the type of motor, however, there may be present, for example, seven power semiconductors to be cooled, so that the assembling requires a great deal of time. Further it is disadvantageous that in case of trouble in the circuit arrangement the conductor plate can be changed only with great difficulty, since, on the one hand, it is required that the motor flange and therewith all the power semiconductors be disassembled, and since, on the other hand, the conductor plate is fastened virtually undetachably to the face insulation shaft by tamping, so that in the disassembling there is present the danger of destroying the conductor plate and/or the face insulation shaft.

Underlying the invention, therefore, is the problem of improving the motor of the type accordding to this category, in such a way that its assembling and also a subsequent changing of parts, especially of the circuit arrangement, are possible in a simplified manner.

According to the invention this is achieved by the means that the power semiconductors are connected indirectly by an annular plate-form cooling body to the motor flange with heat-conducting effect, where the cooling body with the conductor plate and a carrier element supporting the conductor plate form a preasssembled component.

Through this advantageous embodiment the preassembled component of the invention can be fastened over by connecting the cooling body already carrying the power semiconductors to the motor flange, which is much more simply and more rapidly practicable in comparison to the individual assembling of each power semiconductor. The mounting of the conductor plate according to the invention over is made by the carrier element, so that also a changing of the conductor plate by removal of the entire component is simplified. Advantageously, through the indirect engagement of the power semiconductors by the cooling body to the motor flange there is nevertheless assured a very good heat lead-off, since—as already mentioned earlier—the motor flange stands in direct contact with the outside air and can lead off the absorbed heat to this outside air. Accordingly, the motor flange offers an adequately great heat absorption capacity to assure a sufficient cooling of the power semiconductors. Furthermore, the motor flange has to take care of essentially only the cooling of the power semiconductors, since it is hardly heated up, for example, by the stator winding or other heat sources.

Further advantageous developmental features of the invention are contained in the following specification.

From German published application DE-AS 2 146 893 there is already known, to be sure, a collectorless direct-current motor with a preassembled component consisting of conductor plate, cooling body and carrier element; to be sure, with this known motor it is a matter of an internal-rotor motor in which the disk-shaped carrier element is fastened to an external motor casing. On lugs of this carrier disk, power semiconductors are mounted in an arrangement facing the motor by the cooling bodies. Further, to the lugs of the carrier disk there is fastened the conductor plate, but in an arrangement turned away from the motor. Here it is disadvantageous that all the electronic components, especially also the power semiconductors with their cooling bodies, face the motor, for which reason a poor heat lead-of is given.

With the aid of an example of execution represented in the drawings, the invention is to be explained in detail in the following.

Figure 2:
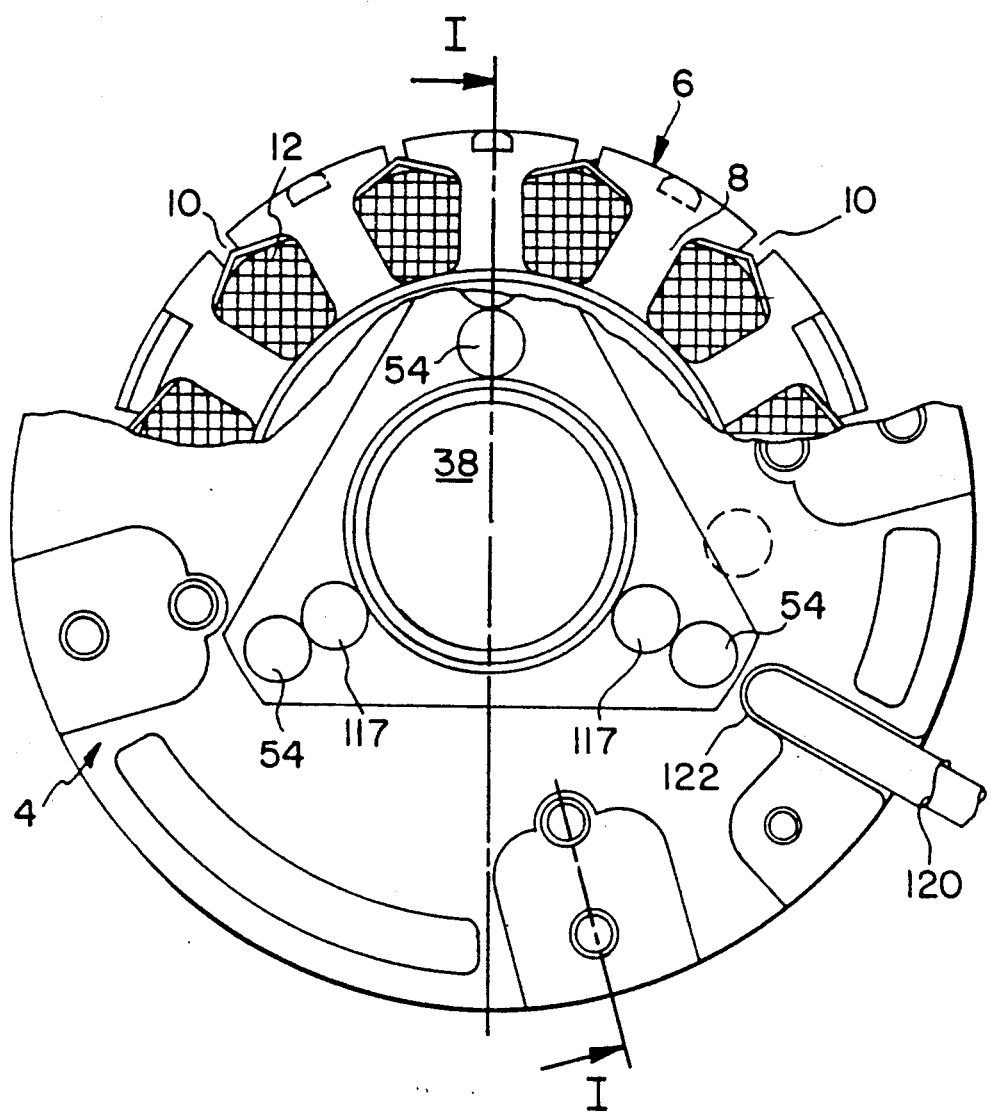
Figure 4:
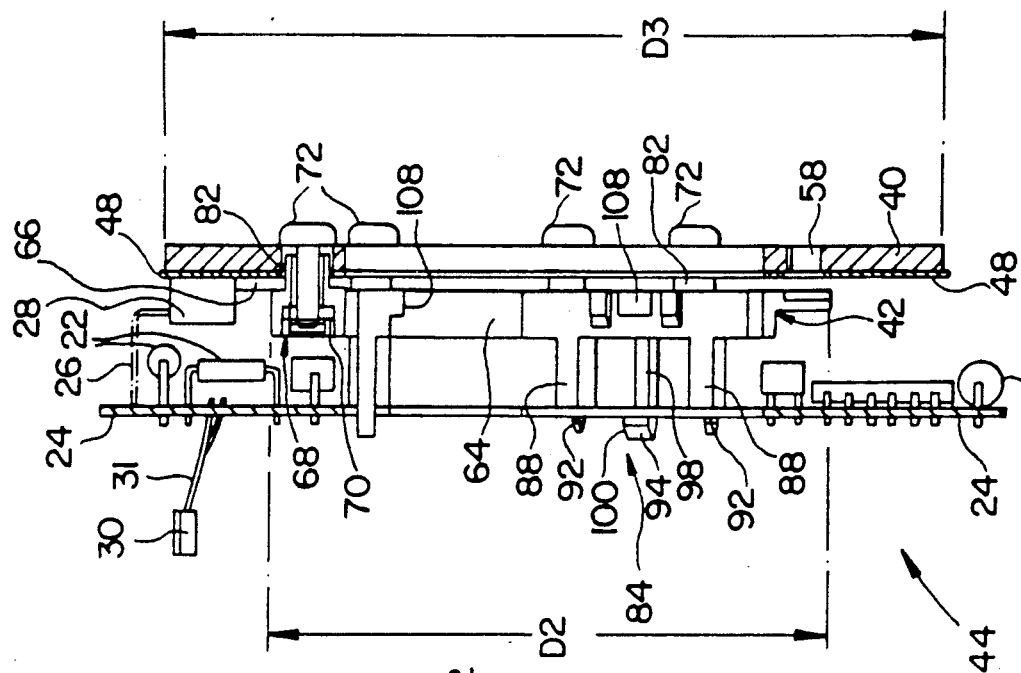
Figure 3:
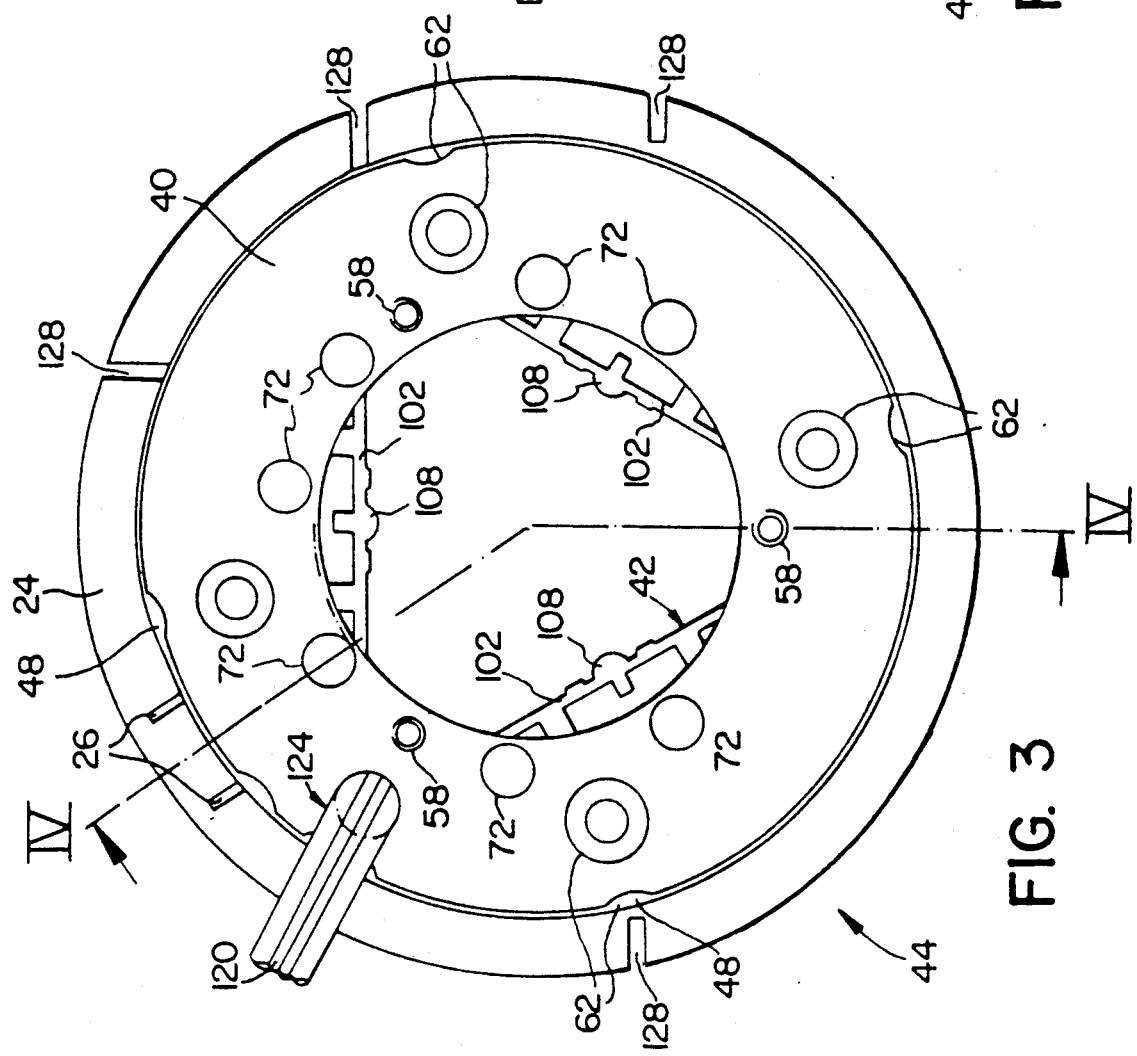
Figure 6:
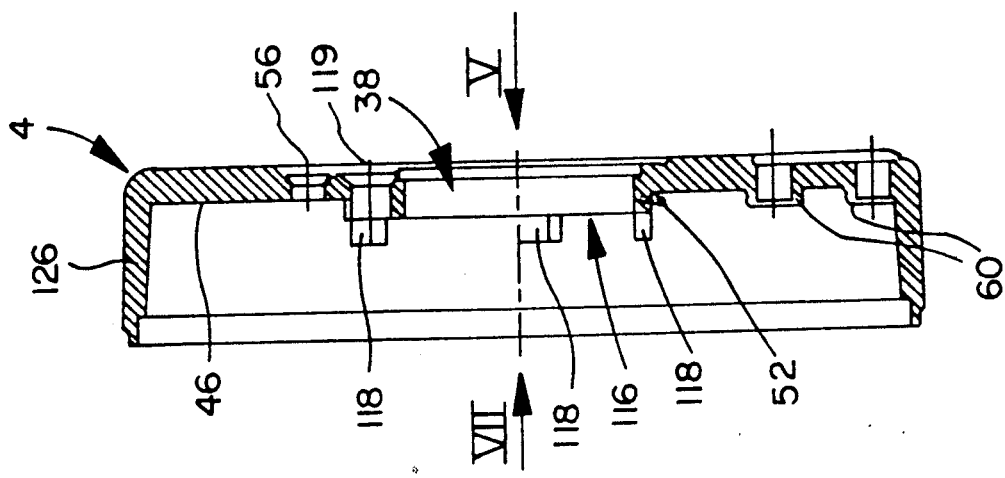
Figure 5:
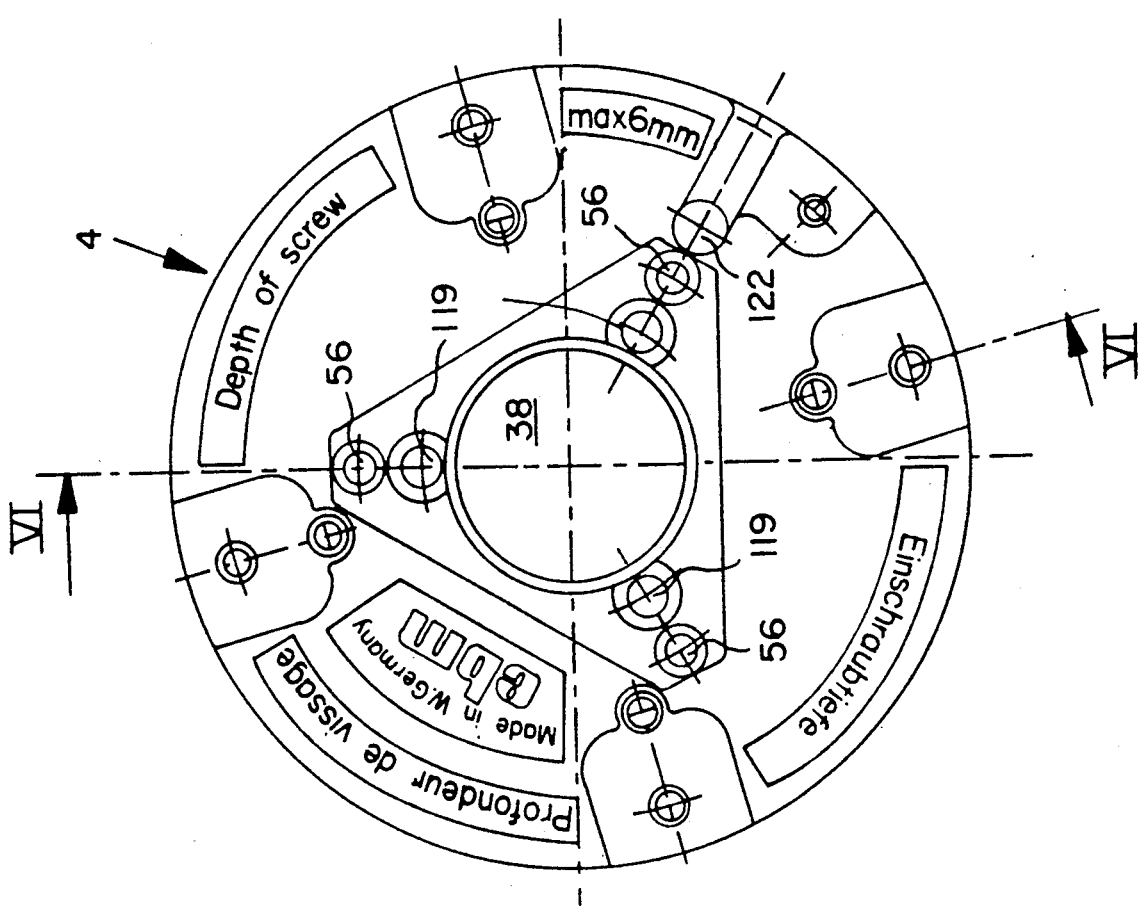
Figure 7:
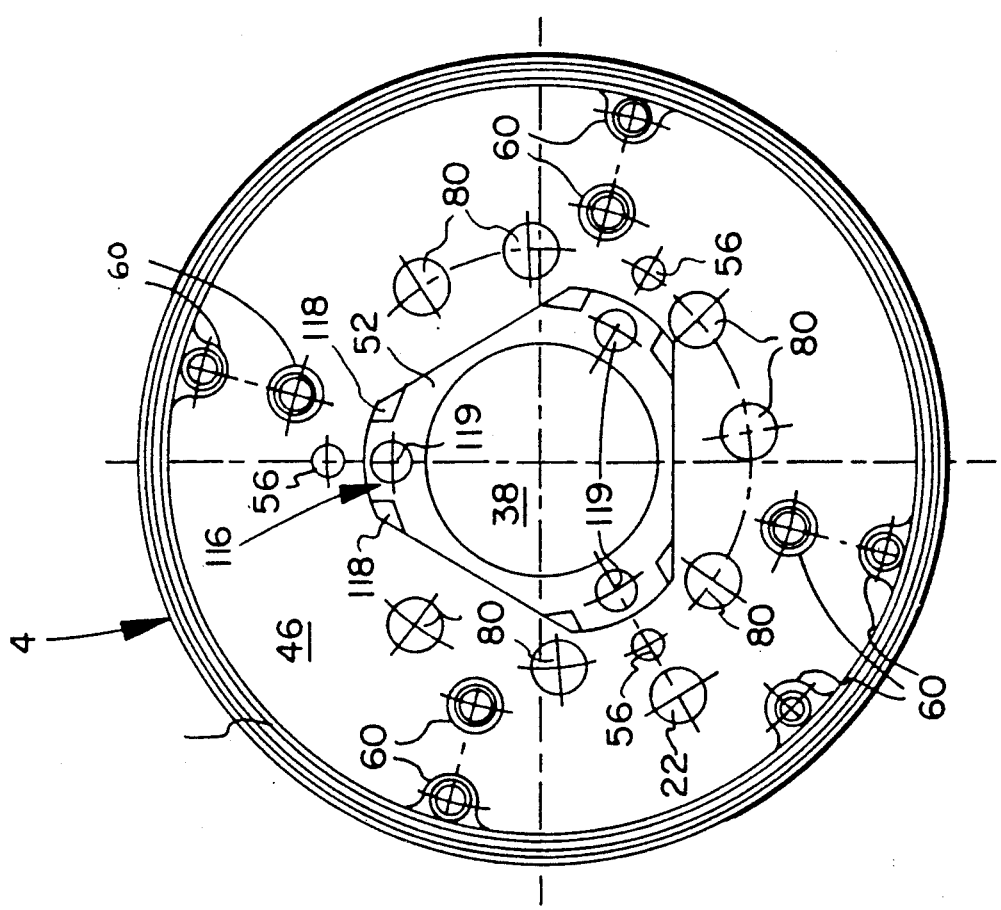
Figure 8:
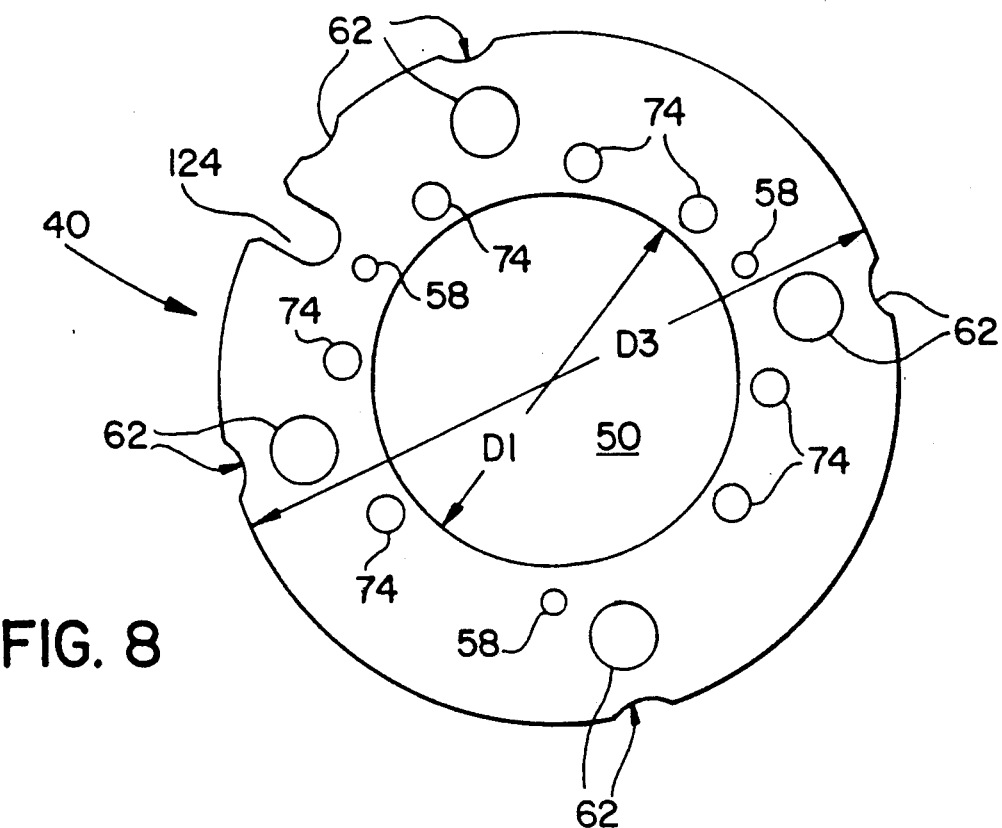
Figure 9:
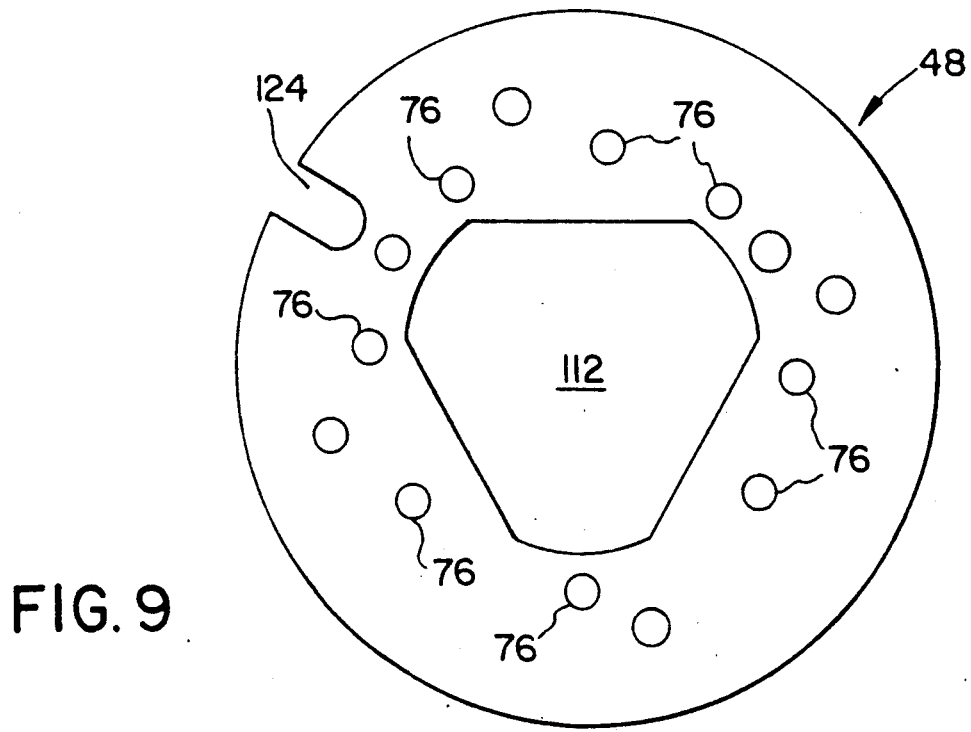
Figure 10:
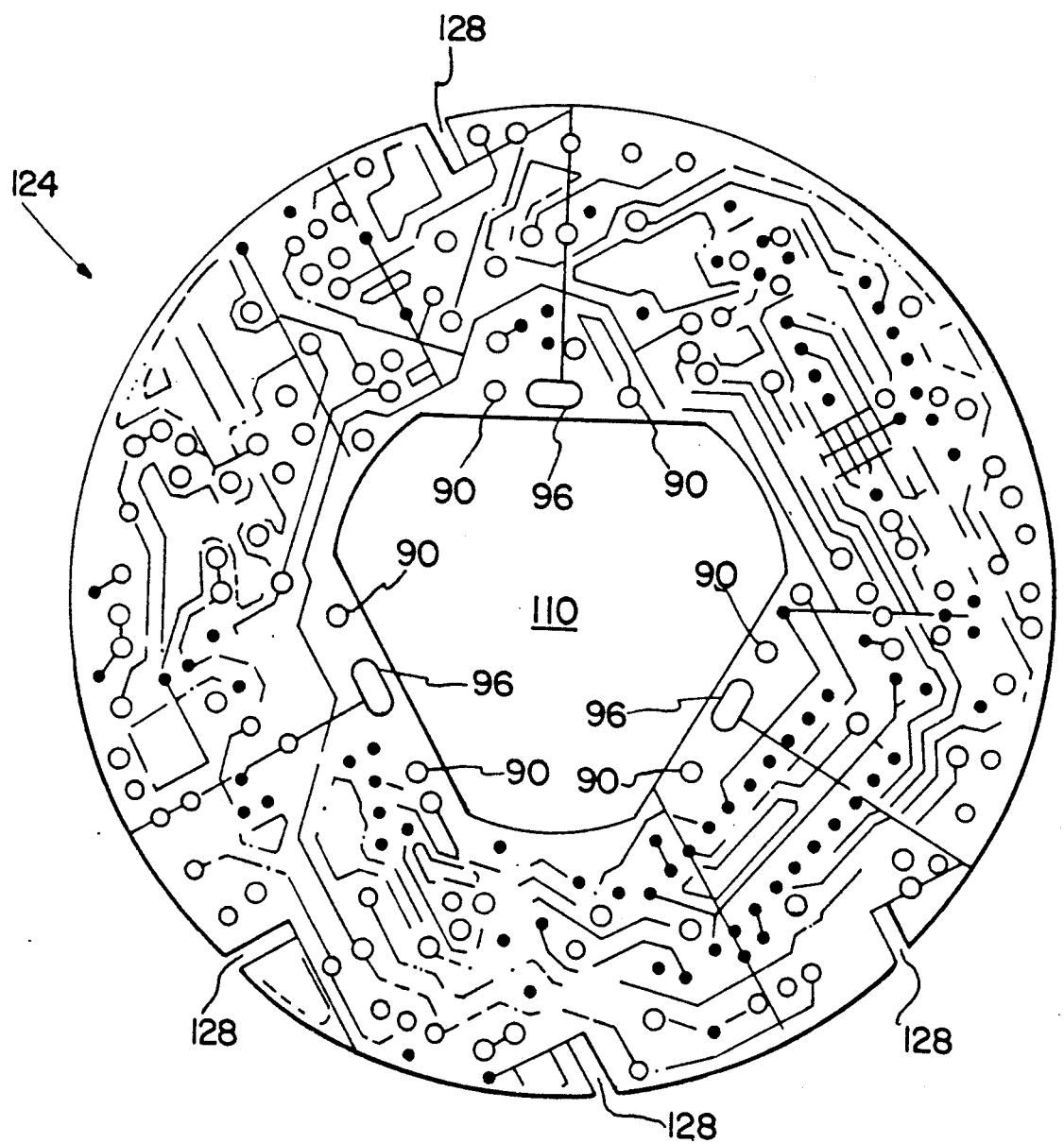
Figure 11:
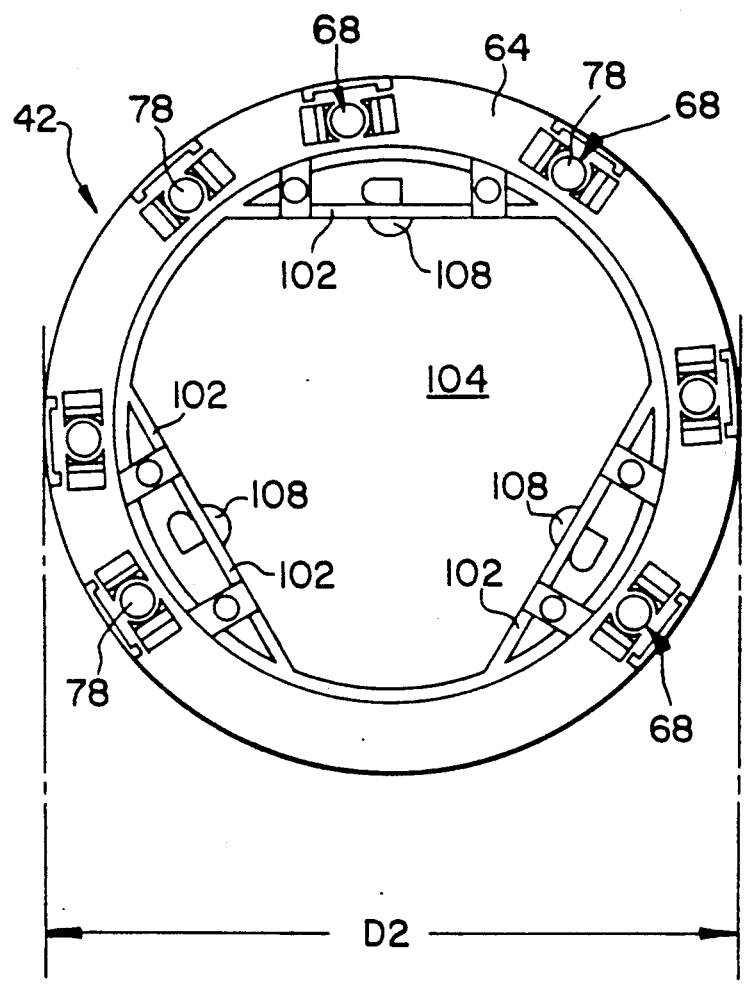

FIG. 1 shows an axial section through a motor according to the invention along the line I—I in FIG. 2;

FIG. 2 a view of the motor-flange side of the motor of the invention in arrow direction II according to FIG. 1 with motor flange partly cut away;

FIG. 3 a plan view from the direction of the flange side onto the preassembled component consisting of cooling body, carrier element and conductor plate;

FIG. 4 a section through the component along the line IV—IV in FIG. 3;

FIG. 5 a plan view of the outside of the motor flange in arrow direction V according to FIG. 6;

FIG. 6 a section through the motor flange along the line VI—VI in FIG. 5;

FIG. 7 a view of the inside of the motor flange in arrow direction VII according to FIG. 6;

FIG. 8 a plan view of the cooling body;

FIG. 9 a plan view of a heat-conducting, electrically insulating foil cut-out arranged between the power semiconductors and the cooling body;

FIG. 10 a plan view of the conductor plate;

FIG. 11 a view of the carrier element in arrow direction XI according to FIG. 13;

FIG. 12 a view of the carrier element in arrow direction XII according to FIG. 13 and FIG. 13 a section along the line XIII—XIII in FIG. 12.

In the various drawing figures like parts are designated in each case with the same reference numbers.

According to FIGS. 1 and 2 a collectorless direct-current external-rotor motor 2 according to the invention consists of a stator 6 fastened to a disk-form motor flange 4, with a stator plate pack 8 and a stator windings 12 arranged in grooves 10 of the plate pack 8, an external rotor 14 surrounding the stator 6 in bell form on its side turned away from the motor flange 4, turnably borne on a rotor shaft (not represented), which is represented only in part in FIG. 1 and carries on the inside an annular permanent magnet 16 enclosing the stator plate pack 8, as well as of an electronic circuit arrangment 18 driving the stator windings 12 for commutation and/or speed regulation. This circuit arrangement 18 has a conductor plate 24 carrying electronic components 22, as they are indicated, besides in FIG. 1, also in FIG. 4 extending perpendicular to the motor longitudinal axis 20, as well as, further, several electrically connected power semiconductors 28, for example transistors or other electronic switching elements, connected by connections 26 on the conductor plate 24. The electronic components 22 are substantially all arranged on the side of the conductor plate 24 facing the motor flange 4. On the other side, facing the stator 6, of the conductor plate 24, however, there is arranged at least one Hall element 30, which is connected by its terminals 31 to the conductor plate 24 in such a way that it extends an axial direction into the zone of the permanent magnets 16 of the rotor 14 and is arranged there in circumferential direction at a defined place one the circumference of the motor 2. The Hall element 30 can hereby detect the particular rotary angular position of the rotor 14 with the aid of the particular magnetization, whereby through the use of the circuit arrangement 18 and the power semiconductors 28 there takes place the commutation of the stator windings 12. The stator windings 12 have winding wire ends 32 which are led to the conductor plate 24 and are there electrically connected.

Into a central opening of the stator plate pack 8 there is pressed a bearing tube 34 which receives the bearing elements (not represented) for the rotary bearing of the external rotor 14. A mounting end 36 of the bearing carrier tube 34, extending over the stator 6 to the outside in the direction of the motor flange 4, and is connected on the face side with the motor flange 4, in particular screwed in place, as will be described in more detail further below. In this manner the stator 6 is consequently fastened by the bearing carrier tube 34 to the motor flange 4. The motor flange 4 has a central opening 38 through which a bearing element can be inserted into the bearing carrier tube 34. This central opening 38 is closable with a bearing cover (not represented).

According to the invention the power semiconductors 28 are joined indirectly, with heat-conducting effect, by an annular disk-form cooling body 40 to the motor flange 4, in which system the cooling body 40 with the conductor plate 24 and a carrier element 42 supporting the conductor plate 24 form a preassembled component 44.

This preassembled component 44 is represented enlarged in FIGS. 3 and 4. From this it is to be perceived that the power semiconductors 28 are fastened on the side, facing away from the motor flange 4 and facing the conductor plate 24, of the cooling body 40, lying on this side in heat-conducting contact, and that the cooling body 40 on the inside 46 facing the stator 6 (see also FIGS. 1 and 6), of the motor flange 4 is joined resting on this inside 46 in heat-conducting contact, in particular screwed to it. There the carrier element 42 is arranged as a spacer between the cooling body 40 and the conductor plate 24 arranged parallel to this, in which system through the carrier element 42 a clear spacing is assured between the cooling body 40 and the conductor plate 24, which is sufficiently great for the accommodation of the electronic components 22 (see also FIG. 4).

Preferably the power semiconductors 28 rest indirectly on the cooling body 40 over, where therebetween is a heat-conducting, electrically insulating layer preferably consisting of an annular foil cut-out 48 (see also FIG. 9). Hereby advantageously the power semiconductors 28 are insulated from one another, but nevertheless arranged in good heat-conducting contact on the cooling body 40.

The annular disk-form cooling body 40, which is represented in plan in FIG. 8, has a central, preferably circular opening 50 with a diameter D1. This diameter corresponds about to the diameter of a circle that circumscribes a, for example, triangular raised part 52 formed on the inside 46 of the motor flange 4 (FIGS. 6 and 7). Further, also the thickness of the cooling body 40 is preferably about 1.5 to 3 mm and corresponds about to the height of the raised part 52 of the motor flange 4. Through this formation according to the invention the cooling body 40 is held centrally positioned on the motor flange 4, in which arrangement fastening screws 54 (FIGS. 1 and 2) extend through holes 56 of the motor flange 4 (FIGS. 5 to 7) in threaded bores 58 of the cooling body 40 (FIG. 8). Further, the motor flange 4 has on the side 46 several positioning lugs 60 distributed over the surface (FIGS. 6 and 7), which engage into holes or recesses 62 (FIG. 8) of the cooling body 40. Through a special arrangement of these positioning lugs 60 and holes or recesses 62 it is achieved that the cooling body 40 can be joined with the motor flange 4 only in a quite definite, relative rotary position, which is of importance for the arrangement aligned in circumferential direction of the hall element or of the Hall elements 30.

According to FIGS. 11 to 13 the carrier element 42 has according to the invention an annular part 64 which is joined with interposition of fastening tabs 66 of the power semiconductors 28 with the cooling body 40, in particular screwed (see also FIG. 4). For this screwing the annular part 64 of the carrier element 42 has on its side facing away from the cooling body 40 in the zone of each power semiconductor 28 a screw nut 70 force fitted and/or in closed linkage in a holding receiver 68 (see FIG. 4). There in each case a screw 72 extends from the flange side through a hole 74 of the cooling body 40 (FIG. 8) through a hole 76 of the heat-conducting foil cut-out 48 (FIG. 9), an undesignated hole of the fastening tab 66 of the respective power semiconductor 28 as well as through a hole 78 of the annular part 64 of the carrier element 42 into an inside thread of the screw nut 70 (FIG. 4 and 11-13). There the heads of the screws 72 lie on the surface of the cooling body 40 facing the motor flange 4. The motor flange 4, therefore, according to FIG. 7 has on the inside 46 receiving depressions 80 (blind holes) for the reception of the screw heads of the screws 72, so that the cooling body 40 can come into position on the inside 46 of the motor flange 4, without the result that the screws 72 would cause trouble.

It is further advantageous if the annular part 64 of the carrier element has on its side facing the cooling body 40 in the zone of each screw nut holding receptacle 68 a lug or added piece 82 aligned with this, of tubular form, enclosing the screw hole 78. These tubular lugs 82 extend through the holes of the semiconductor fastening tabs 66 and through the holes 76 of the heat-conducting foil cut-out 48 into the holes 74 of the cooling body 40, and, namely, maximally into the zone of the surface of cooling body 40 adjacent to the motor flange 4 (FIG. 4) Through the tubular lugs 82 already during the assembling there is assured a provisional fixing or supporting of the power semiconductors 28. Also there is hereby simplified the assembling of the motor 2 or of the preassembled component 44 according to the invention.

The annular part 64 of the carrier element 42 has, in the embodiment of the invention represented, an outside diameter D2 that is smaller than the outside diameter D3 of the cooling body 40. Hereby the cooling body 40 with an annular surface zone extends radially outward beyond the annular part 64 of the carrier element 42. On this annular surface zone of the cooling body 40 extending radially outward beyond the annular part 64 of the carrier element 42 there lie according to the invention the power semiconductors 28 (see FIG. 4).

In the especially advantageous embodiment of the invention represented, the conductor plate 24 is supported by at least one, preferably over three circumferentially distributed, snappable form-fitted or force fitted connections 84 on the carrier element 42 (FIG. 4). As is especially to be learned from FIGS. 4 and 13, each of the snappable connections 84 consists of two resting lugs 88 extending from the carrier element 42 in the direction of the conductor plate 24, presenting in each case a rest surface 86 for the conductor plate 24, with in each case a pin lug 92 arranged on the resting surface 86 and engaging into a positioning opening 90. Further, the snappable connection 84 consisits of a spring-elastic rest arm 98 extending between the rest lugs 88 in the direction of the conductor plate 24, engaging with a hook-type end 94 into a rest opening 96 of the conductor plate 24 and gripping behind its opening edge in the fixed position. There, the clear spacing between the resting surfaces of the resting lugs 88 and of the surface facing the conductor plate 24 of the hook-type end 94 of the rest arm 98 corresponds about to the thickness of the conductor plate 24. Each rest arm 98 has on its hook-type end 94 an introduction bevel 100 (FIG. 4). This introduction bevel 100 brings about, in the emplacing of the conductor plate 24 with the positioning openings 90 on the pin lugs 92, an elastic bending of the rest arms 98, as the introduction bevel 100 comes into engagement with the opening edge of the rest opening 96 until the hook-type ends 94 snaps back gripping behind the rest opening 96. In reverse manner, also a releasing of the conductor plate from the carrier element 42 is possible by elastic bending of the rest arms 98.

It is further advantageous if one of the snappable connections 84, especially with respect to the reciprocal spacing between the two rest lugs 88 with the pin lugs 92 and the corresponding positioning openings 90 of the conductor plate, is constructed differing from the other two snappable connections 84. Hereby an assembling of the conductor plate 24 on the carrier element 42 is possible only in a certain reltive rotary position, which is important, in turn, for the circumferential aligning of the Hall element or Hall elements 30.

According to FIG. 1 the bearing carrier tube 34 is pressed into the hollow cylindrical interior of the stator 6 in such a way that it overhangs, with its mounting end 36, the stator 6 in the direction of the motor flange 4. The mounting end 36 of the bearing tube 34 has in the example represented there a, say, triangular form. In correspondence to FIGS. 3, 11 and 12 the annular part 64 of the carrier element 42 is provided in its interior annular zone with preferably secant-type holding straps 102 so that there results a roughly triangular opening 104 into which the mounting end 36 engages in the assembled state. There, in the embodiment of the invention represented the snappable connections 84 are molded in each case in one piece onto the holding straps 102. Each of the holding straps 102 includes on its side facing the middle of opening 104 of the carrier element 42, a holding lug 108 engaging in an axial as well as a circumferential direction in closed linkage into a recess 106 on the mounting end 36 of the bearing tube 34 (see in this connection also FIG. 1). The point of this information will be explained in the following.

According to FIG. 10 the conductor plate 24 has a lead-through opening 110 aligned with the opening 104 of the carrier element 42 for the mounting end 36 of the bearing tube 34. In like manner according to FIG. 9, also the heat-conducting foil cut-out 48 has a corresponding lead-through opening 112.

The mounting end 36 of the bearing tube 34 is, according to the invention, likewise fastened in a defined relative rotary position on the motor flange 4. For this purpose, the mounting end 36 of the bearing tube 34 has three circumferentially distributed radial lugs 114 which are seated in a circumferential direction in closed linkage in each case in a receptacle 116 (FIG. 7) of the motor flange 4, one of the radial lugs 114 of the mounting end 36 of the bearing tube 34 together with the corresponding receptacle 116 of the mounting flange 4 having a greater width than the other lugs 114 and receptacles 116. According to FIG. 7 each receptacle 116 is formed by two laterally spaced lugs 118 arranged on the raised part 52. As is to be learned from FIG. 1 the radial lugs 114 of the mounting end 36 of the bearing tube 34 have in each case an axial threaded bore 115, in which, for the fastening of the bearing tube 34 and therewith also of the stator 6 on the motor flange 4, there engages a fastening screw 117 through a hole 119 of the motor flange 4 (see FIGS. 5 to 7).

A motor connecting cable 120 (or corresponding individual connecting strands) is connected to the conductor plate 24 and led to the outside through a passage opening 122 of the motor flange 4 (see FIGS. 2, 5 and 7). Since the cooling body 40 and the foil cut-out 48 are arranged between the motor flange 4 and the conductor plate 24, these, too, according to FIGS. 8 and 9 include in each case a border lead-through opening 124 of the motor flange 4 aligning with the passage opening 122 for the motor connecting cable 120.

According to FIGS. 1 and 6 the motor flange 4 advantageously has a circumferential edge 126 extending in an axial direction about to the conductor plate 24. The motor flange 4 serves thus according to the invention for the protected reception of the entire preassembled component 44 and of the Hall element(s) 30 extending in the direction of the stator windings.

For the connection of the winding wire ends 32 of the stator windings 12 to the conductor plate 24 it is advantageous if the conductor plate 24—as is to be perceived in FIG. 10—presents border lead-through slits 128.

The carrier element 42 consists advantageously of plastic, whereby an insulation is achieved between the cooling body 40 and the conductor plate 24. Furthermore, a synthetic material assures the spring elasticity of the rest arms 98 of the snappable connections 84 between the conductor plate 24 and the carrier element 42. The cooling body 40 consists preferably of a metal plate with a thickness of about 1.5 to 3 mm.

The assembling of the motor 2, by reason of the formation according to the invention, is very simple. First of all the preassembled component 44 represented in FIGS. 3 and 4 can be preassembled independently of the motor assembly proper, as the conductor plate 24 is armed with the electronic components 22 and, after connection of the motor connecting cable, connected by the snappable connections 84 with resting effect to the carrier element 42. Thereupon, the cooling body 40 together with the power semiconductors 28 as well as the heat-conducting insulating layer or foil cut-out 48 is fastened by means of the screws 72 engaging into the clampingly supported nuts 70. There then occurs the connecting of the power semiconductors 28, as their terminals 26 are soldered to the conductor plate 24.

Independently of this preassembling of the preassembled component 44, in the assembling of the motor 2, first the bearing tube 34 is pressed into the stator plate pack 8 provided with the stator windings 12. Now the preassembled component 44 is slid onto the mounting end 36 of the bearing tube 34, in which operation the holding lugs 108 of the holding straps 102 of the carrier element 42 are introduced in closed linkage into the recesses 106 of the mounting end 36 of the bearing tube 34, which assures a provisional support of the component 44 on the stator 6 or the bearing tube 34. The winding wire ends 32 of the stator windings 12 are then led through the lead-through slits 128 of the conductor plate 24 and are connected thereto. Now the motor flange 4 is emplaced on the preassembled component 44, in which process the connecting cable 120 is led out through the passage opening 122. Finally, the motor flange, on the one hand, is screwed together with the cooling body 40 by the fastening screws 54 as well as, on the other hand, is connected with the bearing tube 34 by the fastening screws 117 (see in particular FIG. 1).

There then occurs, finally, the assembling of bearing elements (not represented), as these are pressed on both sides into the bearing tube 34, as well as the assembling of the external rotor 14 over a shaft (likewise not represented) guided in the bearing elements.

The invention is not restricted to the embodiment represented and described, but comprises also all forms of execution similarly acting in the sense of the invention.

We claim:

1. A collectorless direct-current external-rotor motor comprising:
   a stator (6) provided with stator windings (12);
   said stator (6) being fastened to a motor flange (4);
   an external rotor (14) surrounding said stator (6) on a side of said stator (6) directed away from said motor flange (4);
   an electronic circuit arrangement (18) for driving said stator windings (12), said electronic circuit arrangement (18) including a conductor plate (24) arranged adjacent to a side of said motor flange (4) facing said stator (6);
   said conductor plate (24) carrying electronic components (22) and also being electrically connected to power semiconductors (28), said power semiconductors (28) being arranged in heat-conducting contact with said motor flange (4);
   an annular disk-form cooling body (40) indirectly joining said power semiconductors (28) to said motor flange (4) with heat-conducting effect;
   a carrier element (42) supporting said conductor plate (24) relative to said cooling body (40); and
   means for connecting said cooling body (40), said carrier element (42) and said conductor plate (24) together to form a preassembled component (44) so that said cooling body (40), said carrier element (42) and said conductor plate (24) can be inserted into and removed from said external-rotor motor (2) together as a unit.

2. An external-rotor motor according to claim 1, wherein said carrier element (42) is arranged as a spacer between said cooling body (40) and said conductor plate (24).

3. An external-rotor motor according to claim 1, wherein said power semiconductors (28) are fastened to one side of said cooling body (40) facing away from said motor flange (4) to rest in a heat-conducting contact with said cooling body (40), and said cooling body (40) is screwed to an inside (46) of said motor flange (4) facing toward said stator (6) to rest in a heat-conducting contact with said motor flange (4).

4. An external-rotor motor according to claim 3, wherein a heat-conducting electrically insulating layer is disposed between said power semiconductors (28) and said cooling body (40), said heat-conducting electrically insulating layer being a circular annular foil cut-out (48).

5. An external-rotor motor according to claim 1, wherein said carrier element (42) is arranged as a spacer between said cooling body (40) and said conductor plate (24), said cooling body (40) being disposed parallel to said conductor plate (24).

6. An external-rotor motor according to claim 1, wherein said carrier element (42) includes an annular part (64), said annular part (64) being screwed together with said cooling body (40) so that fastening tabs (66) of said power semiconductors (28) are interpositioned between said annular part (64) and said cooling body (40).

7. An external-rotor motor according to claim 6, wherein said annular part (64) of said carrier element (42) is provided with at least one screw nut (70) disposed on a side of said annular part facing away from said cooling body (40) in a zone of an associated one of said power semiconductors (28), said screw nut (70) being securely supported in a holding receptacle (68) of said annular part (64), and a screw (72) extending through a hole (74) of said cooling body (40), through a hole (76) of a heat-conducting foil cut-out (48) disposed between said power semiconductors (28) and said cooling body (40), through a hole of an associated one of said fastening tabs (66) of said associated one of said power semiconductors (28), through a hole (78) of said annular part (64) of said carrier element (42) and into an inside thread of said screw nut (70).

8. An external-rotor motor according to claim 7, wherein said annular part (64) of said carrier element (42) includes at least one lug (82) on an opposite side of said annular part (64) facing said cooling body (40) in a zone of and in alignment with said holding receptacle (68) of said annular part (64), said lug (82) having a tubular construction enclosing said hole (78) of said annular part (64), said lug (82) extending through said hole of said fastening tab (66), through said hole (76) of said heat-conducting foil cut-out (48) and into said hole (74) of said cooling body (40) up to a maximal zone of a surface of said cooling body (40) adjacent to said motor flange (4).

9. An external-rotor motor according to claim 6, wherein body portions of said power semiconductors (28) extend from said fastening tabs (66), said body portions rest on an annular surface portion of said cooling body (40) extending radially outward beyond said annular part (64) of said carrier element (42).

10. An external-rotor motor according to claim 6, wherein said annular part (64) of said carrier element (42) includes several hexagonal holding straps (102) on an inner annular portion of said annular part (64) to provide a triangular opening (104) in said carrier element (42), a bearing tube (34) is pressed into said stator (6), a mounting end (36) of said bearing tube (34) overhangs said stator (6) in a direction of said motor flange (4), said triangular opening (104) corresponds to a cross section of said mounting end (36) for receiving said mounting end (36) therethrough.

11. An external-rotor motor according to claim 10, wherein each of said holding straps (102) includes a holding lug (108) on a side thereof facing said triangular opening (104) of said carrier element (42) for engaging, in both an axial direction and a circumferential direction, into a recess (106) of said mounting end (36) of said bearing tube (34).

12. An external-rotor motor according to claim 10, wherein said conductor plate (24) is provided with a lead-through opening (110) aligned with said triangular opening (104) of said carrier element (42) for receiving said mounting end (36) of said bearing tube (34) therethrough.

13. An external-rotor motor according to claim 10, wherein said mounting end (36) of said bearing tube (34) is fastened on said motor flange (4) in a defined relative rotary position.

14. An external-rotor motor according to claim 13, wherein said mounting end (34) of said bearing tube (34) has several radial lugs (114) distributed circumferentially thereon, said lugs (114) being securely seated in associated receptacles (116) provided in said motor flange (4), one of said lugs (114) and its associated receptacle (116) having a width different from the other lugs (114) and their associated receptacles (116).

15. An external-rotor motor according to claim 14, wherein each of said lugs (114) of said mounting end (36) of said bearing tube (34) includes an axial threaded bore (115) for engagingly receiving a fastening screw (117) extending through a hole (119) of said motor flange (4).

16. An external-rotor motor according to claim 1, wherein said conductor plate (24) is supported on said carrier element (42) by circumferentially distributed, snappable connections (84).

17. An external-rotor motor according to claim 16, wherein each of said snappable connections (84) includes two support lugs (88) extending from said carrier element (42) in a direction toward said conductor plate (24) to provide a support surface (86) for said conductor plate (24) and to provide a pin lug (92) extending from said support surface (86) on each support lug (88) for engaging into an associated positioning opening (90) of said conductor plate (24), and further including a spring-elastic rest arm (98) extending between said two support lugs (88) in a direction of said conductor plate (24), said rest arm (98) having a hook-type end (94) for engaging into an associated rest opening (96) of said conductor plate (24) so that said hook-type end (94) grips behind an edge of said rest opening (96).

18. An external-rotor motor according to claim 17, wherein one of said snappable connections (84) is constructed differently from the other snappable connections with respect to reciprocal spacings between said two support lugs (88) and said pin lugs (92) thereof and said associated positioning openings (90) of said conductor plate (24).

19. An external-rotor motor according to claim 1, wherein said cooling body (40) has a border lead-through recess (124) for at least one connecting line (120) connected to said conductor plate (24).

20. An external-rotor motor according to claim 19, wherein said motor flange (4) has a passage opening (122) aligned with said lead-through recess (124) of said cooling body (40).

21. An external-rotor motor according to claim 1, wherein said motor flange (4) has a circumferential edge (126) extending in an axial direction to about said conductor plate (24).

22. An external-rotor motor according to claim 1, wherein said conductor plate (24) has border lead-through slits (128) for winding wire ends (32) of said stator (6).

23. An external-rotor motor according to claim 1, wherein said carrier element (42) is fabricated from a synthetic material.

24. An external-rotor motor according to claim 1, wherein said cooling body (40) is a metal plate having a thickness of about 1.5 to 3 mm.

* * * * *